S. MARCUS.
ARTIFICIAL EYES FOR DOLLS AND THE LIKE.
APPLICATION FILED NOV. 24, 1920.
1,433,899. Patented Oct. 31, 1922.
2 SHEETS—SHEET 2.
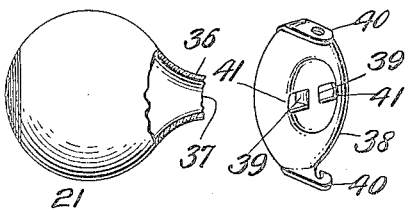
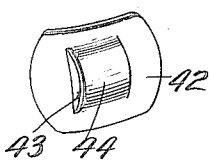
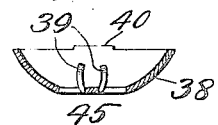
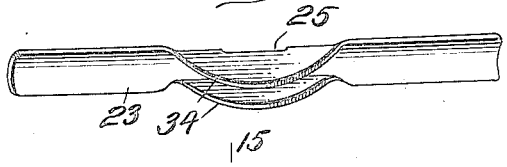
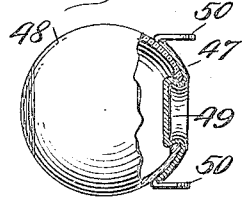
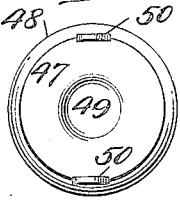
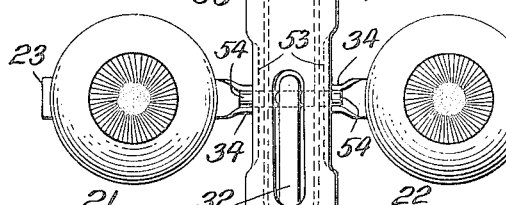
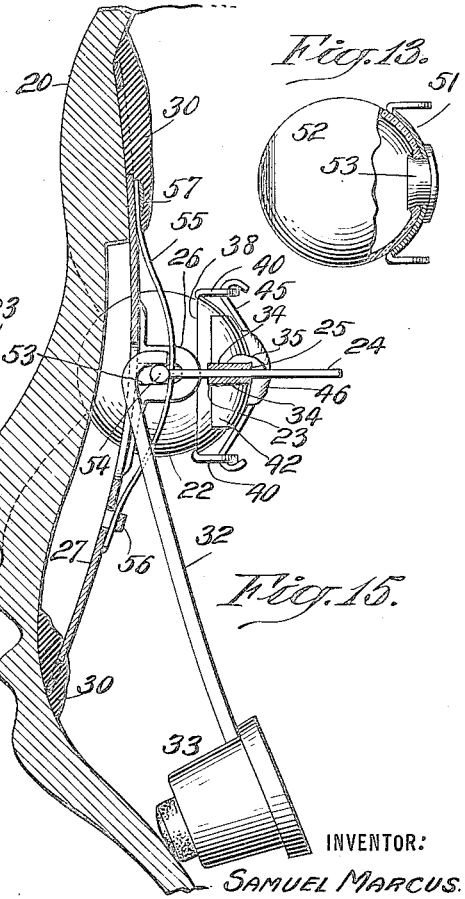
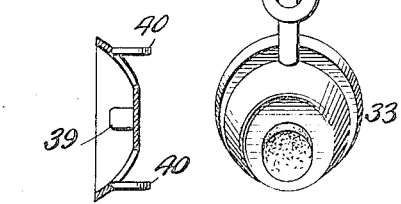
INVENTOR:
SAMUEL MARCUS.
BY
Charles C. Gill,
ATTORNEY Patented Oct. 31, 1922.

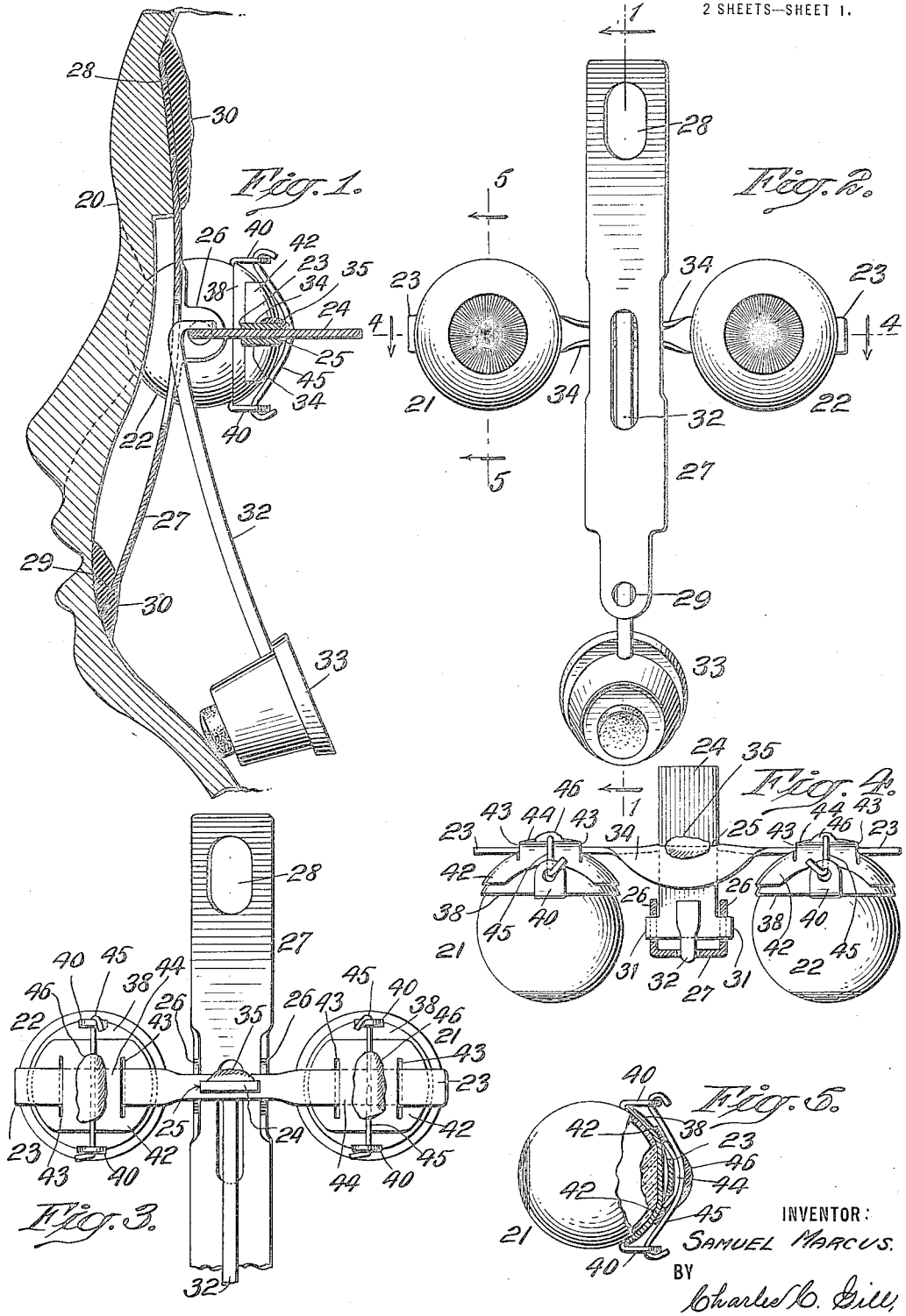

1,433,899

UNITED STATES PATENT OFFICE.

SAMUEL MARCUS, OF BROOKLYN, NEW YORK, ASSIGNOR TO F. & M. NOVELTY CO. INC., OF NEW YORK, N. Y., A CORPORATION OF NEW YORK.

ARTIFICIAL EYES FOR DOLLS AND THE LIKE.

Application filed November 24, 1920. Serial No. 426,133.

*To all whom it may concern:*

Be it known that I, SAMUEL MARCUS, a citizen of the United States, and a resident of Brooklyn, in the county of Kings and State of New York, have invented certain new and useful Improvements in Artificial Eyes for Dolls and the like, of which the following is a specification.

The invention pertains to improvements in artificial eyes for dolls, display figures and the like, and it consists in the novel features hereinafter described and particularly pointed out in the claims.

One object of my invention is to provide suitable means whereby glass eyes may be properly supported and allowed their rocking movement within the heads of dolls, and a further object of the invention is to furnish suitable means whereby the eye sets may be conveniently secured by shellac or the like to the inner surface of the face of a doll's head in suitable relation to the eye sockets.

It has been found difficult to properly support glass eyes within the head of a doll in such a manner as to preserve the due relation of the eyes to the eye sockets and at the same time permit of the rolling action of the eyes in accordance with the movement of the doll; and difficulty has also been found in suitably connecting the fragile glass eyes of a pair of eyes with a bridge or connecting rod, from which a weight is ordinarily suspended. My invention is in part designed to afford suitable means for connecting glass eyes in pairs and also means for suspending the eyes of the pair or eye set within the head of a doll in such manner that the eyes may have a rocking motion and also maintain their proper relation to the eye sockets in the head of a doll.

The invention and satisfactory means for carrying the same into effect will be fully understood from the detailed description hereinafter presented, reference being had to the accompanying drawings, in which:

Fig. 1 is a vertical section through the face of a doll and eye mechanism embodying the essential features of my invention, the section through the eye mechanism being on the dotted line 1—1 of Fig. 2;

Fig. 2 is a front elevation of an eye set embodying my invention;

Fig. 3 is a rear elevation, partly broken away, of the same;

Fig. 4 is a horizontal section through the same taken on the dotted line 4—4 of Fig. 2;

Fig. 5 is a vertical section, partly broken away, through one of the eyes, taken on the dotted line 5—5 of Fig. 2;

Fig. 6 is a detached side elevation, partly broken away and partly in section, of the plain glass eye as manufactured;

Fig. 7 is a perspective view of a cap which I apply on the back portion of the glass eye and interlock the same therewith;

Fig. 8 is a perspective view of a plate I apply upon the rear surface of the cap shown in Fig. 7 after the latter has been secured to the back portion of the eye, and which plate, when in position, receives one end of the bridge-piece serving to connect two eyes to form a pair of eyes;

Fig. 9 is a cross section through the cap shown in Fig. 7;

Fig. 10 is a detached perspective view, taken from the front thereof, of the bridge-piece employed for connecting two eyes to form a pair of eyes;

Fig. 11 is a side elevation, partly broken away and partly in section, of one of the glass eyes and illustrating a modified method of securing the cap thereto;

Fig. 12 is a rear elevation of the same;

Fig. 13 is a side elevation, partly in section, of one of the glass eyes, and illustrates a further modified method of securing the cap thereto;

Fig. 14 is a view corresponding with Fig. 2, but illustrates the employment, at the rear face of the hanger, of a spring acting against the eye-set to normally yieldingly press the eyes against the eye-sockets of a doll's head;

Fig. 15 is a vertical section through the same taken on the dotted line 15—15 of Fig. 14, a portion of the face of a doll being illustrated in section with the eye-set of Fig. 14 mounted therein;

Fig. 16 is a vertical section showing the back eye-cap as slightly modified from the construction presented in Fig. 7, and Fig. 17 is a perspective view of a piece of wire I apply to the ears of the back eye-cap and crossing the plate shown in Fig. 8 for securing said plate and the end of the bridge-piece against said cap.

In the drawings, 20 indicates the face-portion of the head of a doll, and 21, 22, respectively, denote the right eye and left eye for the doll. The eyes 21, 22 are of substantially corresponding construction and are hollow and of glass, and said eyes are carried on the ends of a bridge-piece 23 which connects the eyes to form a pair of eyes and is supported upon a plate 24 which is horizontally disposed and projected through a slot 25 formed in said bridge-piece. The forward end of the plate 24 is pivotally mounted between ears 26 formed on a hanger-plate 27 which is preferably made of sheet metal and formed with a hole 28 in its upper end and a hole 29 in its reduced or tongue-like lower end. The hanger-plate 27 carries the eye-set and is secured against the inner face of the doll's head by the application of shellac 30, said shellac entering the opening 28 in the upper end of the hanger 27 and extending beyond said end and serving to fasten said end of the hanger to the inner surface of the forehead of the doll. The shellac 30 at the lower end of the hanger 27 serves to secure the hanger at its lower end to the inner surface of the chin portion of the doll's face, said shellac being aided in securing the lower end of the hanger in position by entering within the hole 29 in said hanger. The pins 31 at the inner side edges of the forward end of the plate 24 and which enter openings in the ears 26 formed on the hanger 27 may be integral with the plate 24 or formed separately therefrom, as may be desired, it being convenient to form said pins out of the metal of the plate 24, as shown in Fig. 4. Upon the forward end of the plate 24 I secure a depending rod 32 upon whose lower end is secured the usual weight 33. The rod 32 is rigidly secured to the plate 24 so as to rock said plate during the movement of the doll to a reclining position and back to an upright position, and the movement of the plate 24, under the influence of the weight 33, is communicated through the bridge-piece 23 to the eyes 21, 22, whereby the eyes receive their rolling motion during the movement of the doll.

The bridge-piece 23 is preferably formed from a strip of sheet metal and at its central portion has forwardly projecting upper and lower extensions or lips 34, and the slot 25 is formed in the vertical rear edge of the bridge-piece 23 and leads into the space between the upper and lower lips 34. The plate 24 is inserted from the front between the lips 34 and through the slot 25, and after said plate 24 has reached the proper adjustment, it is secured to the bridge-piece 23 by a small lump of solder 35 applied on the edge of the bridge-piece and overlapping upon the upper lip 34 and plate 24, as shown in Fig. 4. The plate 24 may be initially inserted between the lips 34 and through the slot 25 from the front of the bridge-piece, or the bridge-piece may primarily be inserted from the rear end of the plate 24, as may be found convenient. The plate 24 in its relation to the bridge-piece 23 is of great importance in properly positioning the eyes 21, 22 with relation to the eye sockets of the doll, and said bridge-piece may be secured at any position along the length of the plate 24 which will afford to the eyes their proper position with respect to the eye sockets of the doll's head. The manner of adjusting the bridge-piece 23 on the plate 24 will be apparent on inspection of Figs. 1 and 4, and hence requires no further explanation, except to say that the solder 35 is not applied to the bridge-piece and plate 24 until the bridge-piece has attained its correct position of adjustment on said plate. The plate 24 supports the bridge-piece 23, and hence also supports the eyes 21, 22.

The bridge-piece 23 will preferably be formed of sheet metal having ends which are slightly round, in cross-section, as shown in Fig. 10.

The eyes 21, 22 are globular and hollow and at their back-portion are formed with a neck 36 and opening 37, this being the natural condition of the eye as manufactured, and the neck 36 may be more or less cut away or removed, as the occasion may render necessary.

Upon each eye 21, 22 I secure a saucer-shaped cap 38, shown separately in Figs. 7 and 9, this cap being formed of sheet metal and having forwardly bent prongs 39 at its center and rearwardly projected ears 40 at its upper and lower portions. The cap 38 is concaved to fit against the curvature of the eye, and the prongs 39 in said cap are positioned to enter the opening in the neck 36 of the glass eye. The cap 38 should be securely fastened to the glass eye, and in Fig. 5 I illustrate the preferred method of fastening which consists in pressing the cap against the back of the eye while both are heated to a sufficient extent to soften the glass at the neck 36 and cause the glass to flow against the concave wall of the prongs 39; the glass on cooling will firmly secure the cap to the back of the eye, since it will adhere to the cap, anchor the prongs 39 and enter the holes 41 left by the cutting and forward bending of said prongs. The cap 38 may be otherwise secured to the glass eye, as will be hereinafter explained. After the caps 38 have been secured to the eyes 21, 22 I assemble said eyes upon the ends of the bridge-piece 23 by means of auxiliary caps or plates 42, which are slit at 43 and between the slits bulged outwardly to form rounded and longitudinally curved loops 44 which are slid upon the ends of the bridge-piece 23. The plates 42 have curved forward surfaces fitting upon the curved surfaces of the caps 38 and adapted, when necessary, to be adjusted upwardly or downwardly or laterally upon the said caps. After the plates

42 have been slipped upon the bridge-piece 23 said plates are applied against the caps 38 then fastened upon the eyes 21, 22, and in order to secure the plates 42 and ends of the bridge-piece 23 to the caps 38, I employ a piece of piano wire 45 (Fig. 17) which I pass through apertures or recesses in the ears 40 of the plates 38, extending the wire over the loops 44 of the plates 42 and bending the ends of the wire over against the ears 40, as shown in Figs. 4 and 5, for the purpose of holding the wire tightly upon the loops 44. The rear surfaces of the loops 44 are slightly convex, and after the wires 45 are in position the eye and cap can be angularly adjusted in all directions against the plates 42, the wires 45 at this time sliding upon the rear surface of the loops 44, or, in lieu of adjusting the eyes and caps 38 against the plates 42, I may adjust the plates 42 upon the caps 38, the purpose of the adjustment in either case being to suitably arrange the eyes 21, 22, with respect to the eye sockets in the face of a doll's head. The eyes are adjustable toward and from each other on the ends of the bridge-piece 23, since the bridge-piece, by means of the loops 44, permits of the eyes being independently adjusted toward and from each other. After I have secured the proper adjustment of the eyes, I permanently secure them in such position of adjustment by soldering the wires 45 to the loops 44, as I illustrate in Figs. 3 and 5, in which 46 indicates the solder I apply for securing the wires 45 upon the plates 42.

The adjustment of the eyes in a direction forwardly or rearwardly for adapting them to the conditions of the eye sockets in the face of the doll is accomplished by means of the bridge-piece 23 upon the plate 24, as hereinbefore explained, and the adjustment of the eyes toward and from each other to suit the spacing of the eye-sockets is accomplished manually by sliding the eyes toward or from each other on the ends of the bridge-piece 23, and the angular adjustment of the eyes so as to properly locate the iris of the eye with relation to the eye sockets is accomplished by the rolling of the eye, together with the cap 38, against the plates 42 after the wires 45 are in position but before said wire have been permanently fastened by the solder 46. The solder 46 will be applied upon the wires 45 after the eyes have been angularly adjusted.

The mechanism hereinbefore described for mounting, supporting and adjusting the eyes 21, 22 I have found to be particularly efficient, and the mechanism described renders it possible to properly apply hollow fragile glass eyes to the eye sockets of the doll's head. Considerable difficulty has been experienced in properly supporting the hollow fragile glass eyes in the head of a doll, this being partly due to the fragile nature of the eyes and to the difficulty of cutting into the same, the walls of said eyes being very thin and liable to fracture under strain. I do not limit all of the details of the mechanism hereinbefore described to the mounting of glass eyes, since said mechanism is of great advantage even should the eyes be formed of celluloid or any of the materials commonly employed in the manufacture of artificial eyes for dolls.

I have secured the glass eyes to the caps 38 by means other than that illustrated in Fig. 5, which indicates the softening of the neck 36 of the eye and the flowing of the glass over the entire inner surface of the cap 38. In Figs. 11 and 12 I illustrate a further method of securing the cap to the eye, and in Figs. 11 and 12, a modification being shown, I number the cap 47 and the eye 48. The cap 47 has a forwardly projected central hollow neck 49 which I extend into the opening at the back of the eye 48 and then expand the same so that the forward edge of said neck 49 extends outwardly beyond the edges of said opening, whereby the cap 47 becomes locked to the eye 48, as will be readily understood on reference to Fig. 11. The cap 47 is provided with ears 50 corresponding with the ears on the cap 38 shown in Fig. 7.

In Fig. 13 I indicate a further method of securing the eye to its cap, and in Fig. 13 I number the cap 51 and eye 52. The cap 51 is formed with a central opening coinciding with an opening in the eye 52, and in lieu of providing the cap 51 with an integral neck 49, as shown in Fig. 11, I secure the cap and eye together by the hollow rivet 53 which extends through the opening in the cap and into the eye and is expanded at its inner end so as to prevent its escape from the eye, the cap 51 and eye 52 being thus secured together in substantially the same manner that the cap 47 and eye 48 are secured together in Figs. 11 and 12.

In Fig. 16 I show a slight modification of the cap of Fig. 7, the modification consisting merely in slitting and bending the ears 40 out of the body of the cap instead of forming them at the extreme edges thereof.

In Figs. 14 and 15 I illustrate a construction corresponding in every respect with the construction shown in Figs. 1 to 4 inclusive, with the exception that the ears 26 of the hanger-plate 27 are formed with elongated horizontal slots 53 to receive the pins 54 on the inner or forward end of the plate or tongue 24, and that the said pins are acted against by springs 55 in a direction to press the eyes 21, 22 lightly against the eye-sockets in the face of the doll's head. The springs 55 are of substantial utility in maintaining the eyes yieldingly against the eye-sockets, said springs or spring 55 permitting the entire eye-set, less the hanger-plate or bar 27, to yield horizontally toward and from the face of the doll to the extent permitted by the elongated slots 53. Figs. 14, 15 show the springs 55 as an addition to the general construction shown in Fig. 1, and for some makes of dolls' heads the springs 55 are very desirable, while for some other makes of dolls' heads said springs may be omitted. The springs 55 are formed of two members of one piece of bent wire, as shown by dotted lines in Fig. 14, the folded-over end of the rod of wire being set below a lip or loop 56 formed in the bar 27 and the free ends of the folded rod of wire being secured to the bar 27 by means of a drop of solder 57. The springs 55 are bowed rearwardly, as shown in Fig. 15, and the lower folded-over end of the wire forming the springs may have a slight sliding movement along the bar 27 to the extent required for properly holding the eyes with relation to the eye-sockets of the doll's head.

I desire it to be understood that I do not limit my invention to all of the details of form and construction hereinbefore described, further than the appended claims may require.

What I claim as my invention and desire to secure by Letters Patent, is:

1. An eye-set for dolls and the like, comprising a pair of artificial eyes, a bridge-piece connecting the eyes and having lips projecting from its upper and lower edges and being apertured between said lips, a hanger-plate to be secured within the head of a doll and a horizontal plate secured to said hanger-plate and extending between said lips and through said aperture of said bridge-piece, said bridge-piece being adjustable on said horizontal plate and adapted to be secured in rigid relation thereto.

2. An eye-set for dolls and the like, comprising a pair of artificial eyes, a bridge-piece connecting the eyes and having lips projecting from its upper and lower edges and being apertured between said lips, a hanger-plate to be secured within the head of a doll, a horizontal plate pivotally secured to said hanger-plate and extending between said lips and through said aperture of said bridge-piece, said bridge-piece being adjustable on said horizontal plate and adapted to be secured in rigid relation thereto, and a suspended weight secured to the forward end of said horizontal plate for effecting the rolling movement of the eyes on the movement of the doll.

3. An eye-set for dolls and the like, comprising a pair of artificial eyes, caps rigidly secured on the back of said eyes and presenting rounded exterior surfaces, plates mounted on said exterior surfaces of said caps and permitting of the angular adjustment of the caps, with the eyes, against the same and said plates being slit and pressed outwardly to form receiving loops, a bridge-piece inserted at its ends through said slits and under said loops for connecting the eyes, means for securing said plates and caps in their adjusted relation, and means for supporting said bridge-piece in the head of a doll.

4. An eye-set for dolls and the like, comprising a pair of artificial eyes, caps rigidly secured on the back of said eyes and presenting rounded exterior surfaces, plates mounted on said exterior surfaces of said caps and permitting of the angular adjustment of the caps, with the eyes, against the same and said plates being slit and pressed outwardly to form receiving loops, a bridge-piece inserted at its ends through said slits and under said loops for connecting the eyes, means for securing said plates and caps in their adjusted relation, and means for supporting said bridge-piece in the head of a doll, said means for securing said plates and caps in their adjusted relation comprising ears extending rearwardly from said caps and a piece of wire extending over said loops and secured to said ears.

5. An eye-set for dolls and the like, comprising a pair of artificial eyes, caps rigidly secured on the back of said eyes and presenting rounded exterior surfaces, plates mounted on said exterior surfaces of said caps and permitting of the angular adjustment of the caps, with the eyes, against the same, and said plates being slit and pressed outwardly to form receiving loops having longitudinally rounded outer surfaces, a bridge-piece inserted at its ends through said slits and under said loops for connecting the eyes, means for supporting said bridge-piece in the head of a doll and means for securing said plates and caps in their adjusted relation comprising rearwardly extending ears on the caps and wires connecting said ears and bound against the outer rounded surfaces of said loops, said loops and wires primarily being adapted to have angular adjustment relatively to each other.

6. An eye-set for dolls and the like, comprising a pair of globular artificial eyes initially having an opening at the back thereof, caps applied against the back of said eyes and having portions anchored within the openings of the eyes for locking the caps and eyes together, plates mounted on said caps and against which said caps, with the eyes, may have angular adjustment, a bridge-piece connecting said plates, means securing said plates and caps in their adjusted relation to each other and means for supporting the bridge-piece in the head of a doll.

7. An eye-set for dolls and the like, com prising a pair of globular artificial eyes initially having an opening at the back thereof, caps applied against the back of said eyes and having portions anchored within the openings of the eyes for locking the caps and eyes together, plates mounted on said caps and against which said caps, with the eyes, may have angular adjustment, a bridge-piece connecting said plates, means securing said plates and caps in their adjusted relation to each other, means for supporting the bridge-piece in the head of the doll and a spring for pressing the eyes yieldingly against the eye-sockets in the doll's head.

8. An eye-set for dolls and the like, comprising a pair of globular artificial eyes initially having an opening at the back thereof, caps applied against the back of said eyes and having portions anchored within the openings in said eyes for locking the caps and eyes together, plates mounted on said caps and against which said caps, with the eyes, may have angular adjustment, a bridge-piece connecting said plates, means securing said plates and caps in their adjusted relation to each other and means for supporting the bridge-piece in the head of a doll, said plates having loops which receive the ends of said bridge-piece and permit of the independent adjustment of the eyes with relation to each other.

Signed at New York city, in the county of New York and State of New York, this 22nd day of November A. D. 1920.

SAMUEL MARCUS.